United States Patent
Yan (10) Patent No.: US 9,536,147 B2
(45) Date of Patent: Jan. 3, 2017

(54) OPTICAL FLOW TRACKING METHOD AND APPARATUS

(71) Applicant: Huawei Technologies Co., Ltd., Shenzhen (CN)

(72) Inventor: Guoxiong Yan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 99 days.

(21) Appl. No.: 14/618,155

(22) Filed: Feb. 10, 2015

(65) Prior Publication Data

US 2015/0154450 A1 Jun. 4, 2015

Related U.S. Application Data

(63) Continuation of application No. PCT/CN2014/071016, filed on Jan. 21, 2014.

(30) Foreign Application Priority Data

Aug. 1, 2013 (CN) .......................... 2013 1 0331742

(51) Int. Cl.
*G06K 9/00* (2006.01)
*G06T 7/20* (2006.01)
(Continued)

(52) U.S. Cl.
CPC ......... *G06K 9/00624* (2013.01); *G06K 9/4604* (2013.01); *G06K 9/4642* (2013.01);
(Continued)

(58) Field of Classification Search
CPC .................................... G06K 9/00; G06T 7/00
(Continued)

(56) References Cited

U.S. PATENT DOCUMENTS 8,081,820 B2 * 12/2011 Davis ...................... G06K 9/469
382/173
8,229,164 B2 * 7/2012 Miyamoto ................ B60R 1/00
382/103
(Continued)

FOREIGN PATENT DOCUMENTS

AU     2014285593 A1   2/2014
CN     101714256 A    5/2010
(Continued)

OTHER PUBLICATIONS

Adam, A., et al., "Robust Fragments-based Tracking using the Integral Histogram," Proceedings of the IEEE Computer Society Conference on Computer Vision and Pattern Recognition, Jun. 17-22, 2006, 8 pages.
(Continued)

*Primary Examiner* — Abolfazl Tabatabai
(74) *Attorney, Agent, or Firm* — Conley Rose, P.C.

(57) ABSTRACT

An optical flow tracking method includes generating a random structure according to an object to be tracked in an image, where the random structure includes at least two structure blocks with fixed relative positions; tracking all structure blocks in the random structure using an optical flow tracking algorithm to obtain a position offset of the random structure; and estimating a target position of the object according to the position offset of the random structure. According to the optical flow tracking method and apparatus provided in embodiments of the present invention, characteristic points of an object in an image are obtained, and a random structure is generated according to the characteristic points, and each random structure is tracked to obtain a position offset of the random structure, so as to estimate a position of the object, thereby reducing tracking errors and effectively improving tracking precision.

18 Claims, 4 Drawing Sheets

(51) Int. Cl.
  *G06K 9/46*   (2006.01)
  *G06K 9/48*   (2006.01)
  *G06T 11/20*  (2006.01)
  *H04N 5/225*  (2006.01)

(52) U.S. Cl.
  CPC .......... *G06K 9/48* (2013.01); *G06T 7/20* (2013.01); *G06T 7/2046* (2013.01); *G06T 7/2066* (2013.01); *G06T 11/20* (2013.01); *G06T 2207/10016* (2013.01); *G06T 2207/20016* (2013.01); *G06T 2207/30232* (2013.01)

(58) Field of Classification Search
  USPC .......... 382/103, 107, 236; 348/169–172, 352
  See application file for complete search history.

(56) References Cited

U.S. PATENT DOCUMENTS

| | | |
|---|---|---|
| 2004/0064036 A1 | 4/2004 | Mao et al. |
| 2009/0324013 A1 | 12/2009 | Tanaka |
| 2011/0142283 A1 | 6/2011 | Huang et al. |

FOREIGN PATENT DOCUMENTS

| | | |
|---|---|---|
| CN | 101770568 A | 7/2010 |
| CN | 101789125 A | 7/2010 |
| CN | 101923717 A | 12/2010 |
| CN | 101923719 A | 12/2010 |
| CN | 102609708 A | 7/2012 |
| CN | 102800106 A | 11/2012 |
| CN | 103426184 A | 12/2013 |
| TW | I371979 B | 9/2012 |
| TW | I393074 B1 | 4/2013 |
| WO | 2008099399 A8 | 8/2008 |

OTHER PUBLICATIONS

Foreign Communication From a Counterpart Application, European Application No. 14818841.0, Extended European Search Report dated Jul. 8, 2015, 7 pages.
Foreign Communication From a Counterpart Application, Chinese Application No. 201310331742.8, Chinese Office Action dated Sep. 28, 2015, 6 pages.
Foreign Communication From a Counterpart Application, Taiwan Application No. 10420903410, Taiwan Office Action dated Jun. 20, 2015, 4 pages.
Partial English Translation and Abstract of Chinese Patent Application No. CN101923717, May 8, 2015, 10 pages.
Partial English Translation and Abstract of Chinese Patent Application No. CN101770568A, Mar. 11, 2015, 3 pages.
Partial English Translation and Abstract of Chinese Patent Application No. CN101789125A, Mar. 11, 2015, 3 pages.
Foreign Communication From a Counterpart Application, PCT Application No. PCT/CN2014/071016, English Translation of International Search Report dated May 14, 2014, 3 pages.
Foreign Communication From a Counterpart Application, PCT Application No. PCT/CN2014/071016, Written Opinion dated May 14, 2014, 5 pages.

* cited by examiner

OPTICAL FLOW TRACKING METHOD AND APPARATUS

CROSS-REFERENCE TO RELATED APPLICATIONS

This application is a continuation of International Application No. PCT/CN2014/071016, filed on Jan. 21, 2014, which claims priority to Chinese Patent Application No. 201310331742.8, filed on Aug. 1, 2013, both of which are hereby incorporated by reference in their entireties.

TECHNICAL FIELD

The present invention relates to the field of information technologies, and in particular, to an optical flow tracking method and apparatus.

BACKGROUND

In the field of video surveillance, motion of a human face, a pedestrian, or a vehicle is generally detected and tracked using target detection and tracking technology. It also needs to analyze motion information of a target in the field of video compression and robot navigation. Therefore, application scenarios of motion analysis are enriched and have important value. A purpose of motion analysis is to obtain a position offset of an object, so as to track the object. Currently, an optical flow method is usually used to perform motion analysis, and a motion direction and a motion rate of a point in an image can be determined using optical flow calculation. A requirement of the optical flow calculation is that a time interval between adjacent images is very small and no significant change occurs between two adjacent images.

In the prior art, when the optical flow method is used to track a target, a characteristic point is first determined on an object to be tracked in an image; each characteristic point is then tracked one by one using a pyramid optical flow algorithm; a characteristic point with a tracking error is then excluded using a certain criterion; statistics are collected on position offset information of a remaining characteristic point; and a position offset is calculated to obtain a target position of the object to be tracked.

However, different tracking points are prone to ambiguity, thereby resulting in a tracking error and low tracking precision.

SUMMARY

The present invention provides an optical flow tracking method and apparatus, so as to improve precision and real-timeness of target tracking without increasing calculation complexity.

According to a first aspect, an embodiment of the present invention provides an optical flow tracking method, including generating a random structure according to an object to be tracked in an image, where the random structure includes at least two structure blocks with fixed relative positions, and each of the structure blocks includes at least one characteristic point of the object to be tracked; tracking all structure blocks in the random structure using an optical flow tracking algorithm, to obtain a position offset of the random structure; and estimating a target position of the object to be tracked according to the position offset of the random structure.

In a first possible implementation manner of the first aspect, the generating a random structure according to an object to be tracked in an image includes generating, according to an initial position and a size of the object to be tracked in the image, a gradient image of the image in which the object to be tracked is located; scanning the gradient image to obtain a gradient histogram of the gradient image, and determining, according to the gradient histogram, characteristic points with an average gradient greater than a first set value; determining the number of structure blocks included in the random structure, and selecting at least one characteristic point from the characteristic points with the average gradient greater than the first set value; setting a range of a distance between structure blocks and determining characteristic points corresponding to all structure blocks in the random structure according to a position of the selected characteristic point in the image and the number of structure blocks; and generating the random structure according to the characteristic points corresponding to all structure blocks in the random structure.

According to the first possible implementation manner of the first aspect, in a second possible implementation manner, the tracking all structure blocks in the random structure using an optical flow tracking algorithm, to obtain a position offset of the random structure includes using the optical flow tracking algorithm $$\varepsilon(d) = \varepsilon(d_x, d_y) = \sum_{n=0}^{N} \sum_{x=p_x-w_x}^{p_x+w_x} \sum_{y=p_y-w_y}^{p_y+w_y} (I_n(x, y) - J_n(x + dx, y + dy))^2,$$

to determine a sum of displacement residuals of all structure blocks in the random structure, where the sum of displacement residuals of all structure blocks in the random structure is used as the position offset of the random structure; and $\varepsilon(d)$ is the sum of the displacement residuals of all structure blocks in the random structure, d is a displacement of a structure block, $d_x$ is a displacement of the structure block in an x direction, $d_y$ is a displacement of the structure block in a y direction, dx is a displacement of a characteristic point included in the random structure in the x direction, dy is a displacement of the characteristic point included in the random structure in the y direction, x is a horizontal coordinate of an initial position of the characteristic point included in the random structure in the image, y is a vertical coordinate of the initial position of the characteristic point included in the random structure in the image, $I_n(x,y)$ is the initial position of the characteristic point included in the random structure in the image, $J_n(x+dx,y+dy)$ is a target position of the characteristic point included in the random structure in the image, $p_x$ is a horizontal coordinate of a midpoint of the structure block in the random structure, $p_y$ is a vertical coordinate of the midpoint of the structure block in the random structure, $w_x$ is the number of pixels in a distance from the midpoint of the horizontal coordinate of the structure block to an edge of the structure block, $w_y$ is the number of pixels in a distance from the midpoint of the vertical coordinate of the structure block to an edge of the structure block, and N is the number of structure blocks in the random structure.

According to the first aspect and any one of the first and the second possible implementation manners of the first aspect, in a third possible implementation manner, after the generating a random structure according to an object to be tracked in an image, the method further includes filtering out a first error characteristic point that has an error exceeding a second set value and is included in all structure blocks in the random structure, so as to obtain a random structure that undergoes first error filtration; and the tracking all structure blocks in the random structure using an optical flow tracking algorithm includes using the optical flow tracking algorithm to track all structure blocks in the random structure that undergoes the first error filtration.

According to the third possible implementation manner of the first aspect, in a fourth possible implementation manner, after the filtering out a first error characteristic point that has an error exceeding a second set value and is included in all structure blocks in the random structure, so as to obtain a random structure that undergoes the first error filtration, the method further includes filtering out, using a normalized correlation coefficient (NCC) method, a second error characteristic point from characteristic points included in all structure blocks in the random structure that undergoes the first error filtration, so as to obtain a random structure that undergoes second error filtration; and the tracking all structure blocks in the random structure using an optical flow tracking algorithm includes using the optical flow tracking algorithm to track all structure blocks in the random structure that undergoes the second error filtration.

According to the fourth possible implementation manner of the first aspect, in a fifth possible implementation manner, the estimating a target position of the object to be tracked according to the position offset of the random structure includes determining that an average value or a median value of the position offset of the random structure as a position offset of the object to be tracked; and adding up the position offset of the object to be tracked and the initial position of the object to be tracked, to obtain the target position of the object to be tracked.

According to a second aspect, an embodiment of the present invention provides an optical flow tracking apparatus, including a random structure generating module configured to generate a random structure according to an object to be tracked in an image, where the random structure includes at least two structure blocks with fixed relative positions, and each of the structure blocks includes at least one characteristic point of the object to be tracked; an optical flow tracking module configured to track all structure blocks in the random structure using an optical flow tracking algorithm to obtain a position offset of the random structure; and a position estimating module configured to estimate a target position of the object to be tracked according to the position offset of the random structure.

In a first possible implementation manner of the second aspect, the random structure generating module is configured to generate, according to an initial position and a size of the object to be tracked in the image, a gradient image of the image in which the object to be tracked is located; scan the gradient image to obtain a gradient histogram of the gradient image, and determine, according to the gradient histogram, characteristic points with an average gradient greater than a first set value; determine the number of structure blocks included in the random structure, and select at least one characteristic point from the characteristic points with the average gradient greater than the first set value; set a range of a distance between structure blocks and determine characteristic points corresponding to all structure blocks in the random structure according to a position of the selected characteristic point in the image and the number of structure blocks; and generate the random structure according to the characteristic points corresponding to all structure blocks in the random structure.

According to the first possible implementation manner of the second aspect, in a second possible implementation manner, the optical flow tracking module is configured to use the optical flow tracking algorithm $$\varepsilon(d) = \varepsilon(d_x, d_y) = \sum_{n=0}^{N} \sum_{x=p_x-w_x}^{p_x+w_x} \sum_{y=p_y-w_y}^{p_y+w_y} (I_n(x, y) - J_n(x + dx, y + dy))^2$$

to determine a sum of displacement residuals of all structure blocks in the random structure, where the sum of displacement residuals of all structure blocks in the random structure is used as the position offset of the random structure; and $\epsilon(d)$ is the sum of the displacement residuals of all structure blocks in the random structure, d is a displacement of a structure block, $d_x$ is a displacement of the structure block in an x direction, $d_y$ is a displacement of the structure block in a y direction, dx is a displacement of a characteristic point included in the random structure in the x direction, dy is a displacement of the characteristic point included in the random structure in the y direction, x is a horizontal coordinate of an initial position of the characteristic point included in the random structure in the image, y is a vertical coordinate of the initial position of the characteristic point included in the random structure in the image, $I_n(x,y)$ is the initial position of the characteristic point included in the random structure in the image, $J_n(x+dx,y+dy)$ is a target position of the characteristic point included in the random structure in the image, $p_x$ is a horizontal coordinate of a midpoint of the structure block in the random structure, $p_y$ is a vertical coordinate of the midpoint of the structure block in the random structure, $w_x$ is the number of pixels in a distance from the midpoint of the horizontal coordinate of the structure block to an edge of the structure block, $w_y$ is the number of pixels of in distance from the midpoint of the vertical coordinate of the structure block to an edge of the structure block, and N is the number of structure blocks in the random structure.

According to the second aspect and any one of the first and the second possible implementation manners of the second aspect, in a third possible implementation manner, the apparatus further includes an error filtering module configured to filter out a first error characteristic point that has an error exceeding a third set value and is included in all structure blocks in the random structure, so as to obtain a random structure that undergoes first error filtration; and the optical flow tracking module is configured to use the optical flow tracking algorithm to track all structure blocks in the random structure that undergoes the first error filtration.

According to the third possible implementation manner of the second aspect, in a fourth possible implementation manner, the error filtering module is further configured to filter out, using a NCC method, a second error characteristic point from characteristic points included in all structure blocks in the random structure that undergoes the first error filtration, so as to obtain a random structure that undergoes second error filtration; and the optical flow tracking module is configured to use the optical flow tracking algorithm to track all structure blocks in the random structure that undergoes the second error filtration.

According to the fourth possible implementation manner of the second aspect, in a fifth possible implementation manner, the position estimating module is configured to determine that an average value or a median value of the position offset of the random structure as a position offset of the object to be tracked; and add up the position offset of the object to be tracked and the initial position of the object to be tracked, to obtain the target position of the object to be tracked.

According to the optical flow tracking method and apparatus provided in the embodiment of the present invention, characteristic points of an object to be tracked in an image are obtained, a random structure is generated according to the characteristic points, and each random structure is tracked to obtain a position offset of the random structure, so as to estimate a position of the object to be tracked. In comparison with a manner of tracking characteristic points one by one in the prior art, in the tracking method in the embodiment of the present invention, tracking errors are reduced and tracking precision is effectively improved using a structural constraint.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1:
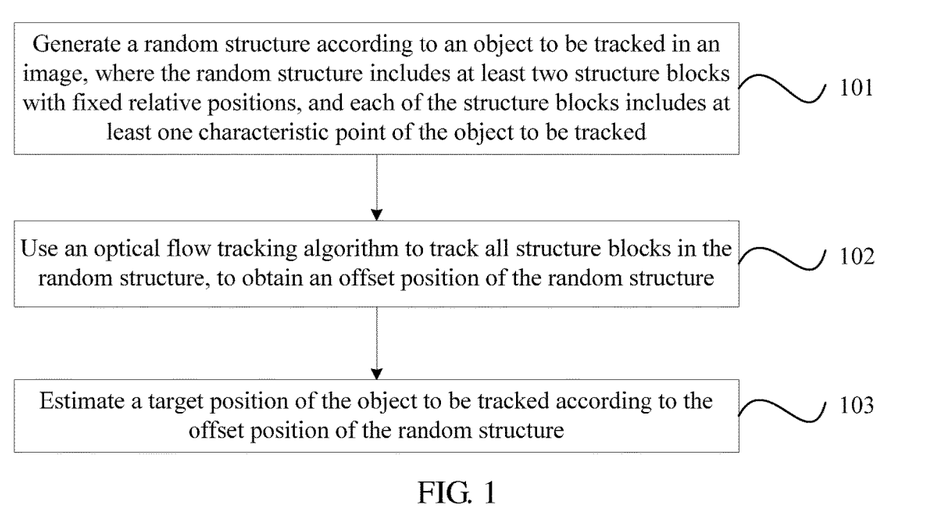
FIG. 1 is a flowchart of an optical flow tracking method according to a first embodiment of the present invention.

FIG. 1 is a flowchart of an optical flow tracking method according to a first embodiment of the present invention. The method provided in the embodiment is applicable to fields relating to object tracking in an image, such as the field of video surveillance and robot navigation. The following steps may be executed by a device with an image processing function, such as a computer, a tablet (e.g. iPAD), and a mobile phone. As shown in FIG. 1, the method provided in the embodiment may include the following steps.

101: Generate a random structure according to an object to be tracked in an image, where the random structure includes at least two structure blocks with fixed relative positions, and each of the structure blocks includes at least one characteristic point of the object to be tracked.

Each image may be divided into a plurality of local area pixel blocks, and a characteristic point is a description of each local area pixel block in the image, where the description includes a description of a position of the local area pixel block and a description of a specific characteristic of the local area pixel block. The description of the position may be represented by coordinates of each characteristic point in a local area, and the description of the specific characteristic of the local area pixel block may include one or more of the following characteristics of the local area pixel block: a color characteristic, a textual characteristic, a spatial relationship characteristic, and the like, which is not particularly limited in the present invention. Each random structure may include at least two structure blocks, and each structure block includes at least one characteristic point of the object to be tracked. Selection of the structure blocks in each random structure is random, and several structure blocks may be selected in a specific distance range as a random structure. A shape of the random structure is also random, without a specific requirement. The number of characteristic points included in each structure block is not limited to one, and several characteristic points that are close to each other may also be included.

102: Track all structure blocks in the random structure using an optical flow tracking algorithm, to obtain a position offset of the random structure.

In this step, performing optical flow tracking on all structure blocks in the random structure may be taking each random structure as a whole, and tracking a plurality of structure blocks in the random structure at the same time using an optical flow tracking method, so as to obtain a position offset of each random structure. A plurality of structure blocks is tracked at the same time, which can effectively avoid ambiguity that occurs when a single characteristic point is tracked, and reduce tracking errors.

When the optical flow tracking is performed, a pyramid optical flow tracking algorithm may be used to perform, from a top layer of the image, iterative calculation for each layer, so as to obtain the ultimate position offset. Basic idea of the pyramid optical flow tracking algorithm is as follows: first, an image pyramid is constructed, then, an initial value of a position offset is set to zero, and estimation and iteration are performed on the position offset from a top layer of the pyramid to a bottom layer, and an ultimate iteration result is the position offset of the random structure.

A specific process of constructing the image pyramid is as follows: an original image as the bottom layer of the pyramid may be recorded as F=0, and the original image is down-sampled to $1/2^{2N}$ of an original size to obtain an image at layer F=1, where a value of N is generally 1, and severe loss of image information occurs if the value of N is too large. Therefore, a motion distance of a target pixel between adjacent frames at the layer F=1 becomes $D/2^N$, where D is a motion distance of a target pixel between adjacent frames in the original image, that is, a displacement of the characteristic point. According to this rule, when F reaches a certain value, generally, $3 \leq F \leq 5$, a target motion scale between adjacent frames at the top layer becomes a sub-pixel level. Therefore, a constraint condition of little motion required by the optical flow tracking algorithm during application can be met, and precise optical flow estimation is performed.

103: Estimate a target position of the object to be tracked according to the position offset of the random structure.

It should be noted that an initial position of an object to be tracked in an image involved in the present invention refers to a position of the object to be tracked in the image before image tracking is performed, that is, before a position of the object to be tracked in the image changes; and a target position refers to a position of the object to be tracked in the image after image tracking is performed, that is, after the position of the object to be tracked in the image changes. A difference value between the target position and the initial position is the position offset, that is, a displacement generated by the object to be tracked during an image tracking process is the position offset. Generally, the image tracking may be performed in a unit of a frame, that is, tracking can be performed on a change in a position of the object to be tracked in a latter frame of the image relative to a position of the object to be tracked in a former frame of the image. In the embodiment of the present invention, both the initial position and the target position may be represented by coordinate values, and may also be represented in other manners, such as a vector, which is not particularly limited in the present invention.

Related calculation is performed according to the obtained position offset of each random structure, for example, calculating an average value of all position offsets or calculating a median value of position offsets of all random structures, so as to obtain the position offset of the tracked target object. Then, the position offset may be added up with the position of the tracked object in the original image, so as to obtain the target position of the tracked object.

According to the optical flow tracking method provided in the embodiment of the present invention, characteristic points of an object to be tracked in an image are obtained, a random structure is generated according to the characteristic points, and each random structure is tracked to obtain a position offset of the random structure, so as to estimate a position of the object to be tracked. In comparison with a manner of tracking characteristic points one by one in the prior art, in the tracking method in the embodiment of the present invention, tracking errors are reduced and tracking precision is effectively improved using a structural constraint.

Figure 2:
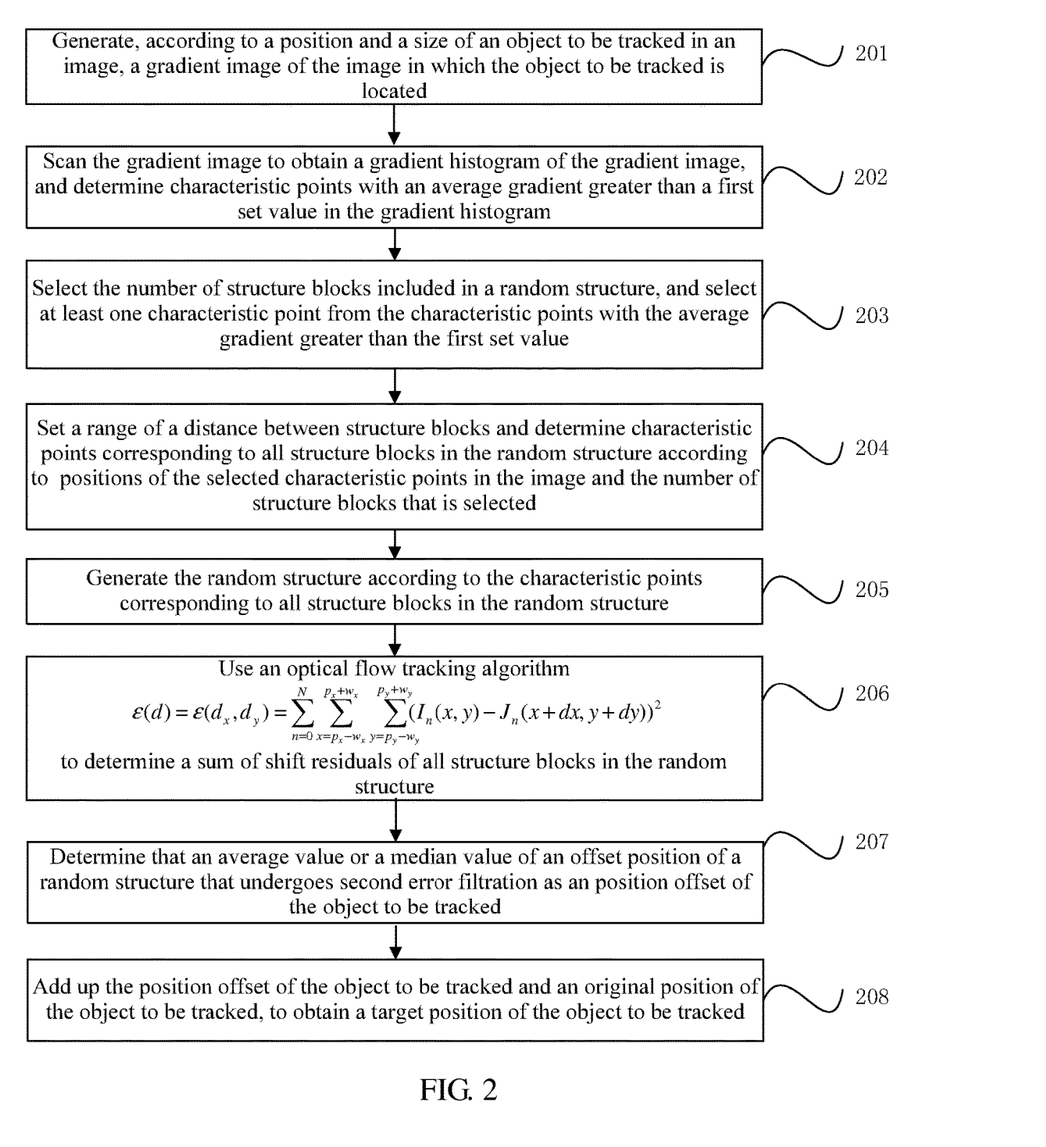
FIG. 2 is a flowchart of an optical flow tracking method according to a second embodiment of the present invention.

FIG. 2 is a flowchart of an optical flow tracking method according to a second embodiment of the present invention. The method provided in the embodiment is applicable to a field relating to object tracking in an image, such as the field of video surveillance and robot navigation. With reference to FIG. 1 and FIG. 2, on a basis of the first embodiment, the embodiment of the present invention provides a specific process of the optical flow tracking method.

201: Generate, according to an initial position and a size of an object to be tracked in an image, a gradient image of the image in which the object to be tracked is located.

In a field, such as video surveillance, when a target object needs to be tracked, first, an initial position and a size of the object to be tracked in an image need to be obtained, so that the target object can be tracked as correctly as possible during tracking, so as to reduce tracking errors. After the initial position and the size of the object to be tracked in the image are obtained, some calculation may be performed on the image to generate a gradient image of the image where the object to be tracked is located. A gradient refers to a position where an image grey-scale value significantly changes. If the image is seen as a two-dimensional discrete function, a gradient of the image is obtained by performing derivation on the two-dimensional discrete function. Therefore, the gradient image refers to an image obtained after the gradient of the image is obtained. The gradient image can well reflect a characteristic of an object in the image. When the gradient image is generated, derivation may be directly performed on the two-dimensional function of the image, or several typical estimation methods in linear filtering methods may be used, for example, methods such as a Sobel operator, a Prewitt operator, and a Roberts operator. Using the Sobel operator as an example, two groups of 3*3 matrixes are provided, a horizontal and a vertical gradient image are calculated, and convolution is performed on the obtained horizontal gradient image and vertical gradient image, so as to obtain a gradient image.

After the gradient image of the image in which the object to be tracked is located is generated, points with a gradient amplitude greater than a certain set value in the area of the object to be tracked of the gradient image may be selected as characteristic points of the object to be tracked, where these characteristic points can well reflect a characteristic of the object to be tracked. The gradient image of the image is generated, point sets that are in a target area and have a large gradient amplitude are obtained by scanning, and these point sets are used as the characteristic points. Alternatively, some traditional characteristic extraction algorithms, such as a Sobel operator or a Roberts operator, may also be used to perform edge detection on the image, detected edge characteristic points are used as characteristic points of the object to be tracked. The set value may be set according to a specific gradient image, and different gradient images may have different set values, and a basis for setting the set value is that a point that is greater than the set value can well reflect a characteristic of the object to be tracked. A specific setting may be obtained according to a prior knowledge, or a value may also be estimated in a possible range of the gradient. For example, a median value of all gradients may be selected as the set value.

202: Scan the gradient image to obtain a gradient histogram of the gradient image, and determine, according to the gradient histogram, characteristic points with an average gradient greater than a first set value.

The generated gradient image may be scanned, for example, the gradient image may be scanned using a 3*3 template, so as to obtain the gradient histogram of the image, and the characteristic points, with the average gradient greater than the first set value, of the object to be tracked in the gradient histogram are determined and recorded. The 3*3 template is a pre-processing template, and the template may be used to calculate a maximum gradient or an average gradient of each local area in the image, so as to obtain, by statistics, the gradient histogram of each pixel in the gradient image. The average gradient refers to magnitude of a grayscale difference near both sides of a border or a hatch of the image, that is, magnitude of a gray-scale change rate. The average gradient is also called definition, which can show how clear the image is and reflect a contrast of minute details and a texture change characteristic in the image. Generally, a larger average gradient indicates a clearer image. For example, the average gradient may refer to an average value of gradients between a pixel and an adjacent pixel of the pixel, for example, in a horizontal gradient, an average value of a gradient between a pixel and a pixel on the left of the pixel and a gradient between the pixel and a pixel on the right of the pixel. It should be noted that the first set value is less than the set value involved when the characteristic point of the object to be tracked is determined, that is, it is determined that positions of all the extracted characteristic points of the object to be tracked are to be recorded, and all positions with the average gradient greater than the first set value in the gradient histogram are recorded and stored in a gradient array.

203: Select the number of structure blocks included in a random structure, and select at least one characteristic point from the characteristic points with the average gradient greater than the first set value.

The random structure may be extracted from the characteristic points, so that subsequent tracking may be performed in a unit of a random structure, thereby reducing ambiguity that occurs when tracking is performed on a single characteristic point. The number of structure blocks may be randomly selected. A distance between structure blocks and a range of a size of each structure block may be preset according to a specific requirement, for example, the size of each structure block in the random structure may be limited to a range of [3*3, 12*12], a range of the number of structure blocks is (1, 4), and a range of the distance between structure blocks is (1, target size); and at least one characteristic point is selected from the characteristic points with the average gradient greater than the first set value. Generally, one characteristic point may be selected from the characteristic points with the average gradient greater than the first set value.

204: Set a range of the distance between structure blocks and determine characteristic points corresponding to all structure blocks in the random structure according to positions of the selected characteristic points in the image and the number of structure blocks.

The characteristic points corresponding to all structure blocks in the random structure are determined, and positions corresponding to these characteristic points are found in the gradient array according to the number of structure blocks that is selected, the range of the distance between structure blocks, and related positions.

205: Generate a random structure according to the characteristic points corresponding to all structure blocks in the random structure.

Figure 3:
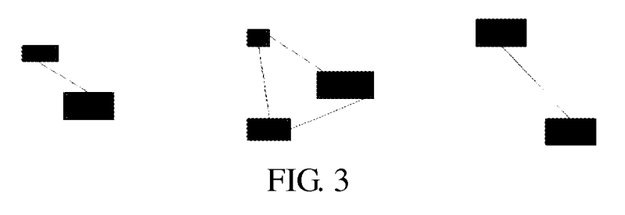
FIG. 3 is a schematic diagram of a possible random structure generated according to the second embodiment of the present invention.

The random structure is generated according to the characteristic points that are corresponding to the structure blocks and obtained in the foregoing step, so as to track the target object in a unit of each random structure. FIG. 3 is a schematic diagram of a possible random structure generated according to the second embodiment of the present invention. As shown in FIG. 3, in the random structure generated according to the embodiment, a size of a structure block, the number of structure blocks, and a distance between structure blocks are not particularly limited, as long as they conform to a preset range.

206: Use an optical flow tracking algorithm $$\varepsilon(d) = \varepsilon(d_x, d_y) = \sum_{n=0}^{N} \sum_{x=p_x-w_x}^{p_x+w_x} \sum_{y=p_y-w_y}^{p_y+w_y} (I_n(x, y) - J_n(x + dx, y + dy))^2, \quad (1)$$

to determine a sum of displacement residuals of all structure blocks in the random structure, where the sum of displacement residuals of all structure blocks in the random structure is used as the position offset of the random structure. $\varepsilon(d)$ is the sum of the displacement residuals of all structure blocks in the random structure, d is a displacement of a structure block, $d_x$ is a displacement of the structure block in an x direction, $d_y$ is a displacement of the structure block in a y direction, dx is a displacement of a characteristic point included in the random structure in the x direction, dy is a displacement of the characteristic point included in the random structure in the y direction, x is a horizontal coordinate of an initial position of the characteristic point included in the random structure in the image, y is a vertical coordinate of the initial position of the characteristic point included in the random structure in the image, $I_n(x,y)$ is the initial position of the characteristic point included in the random structure in the image, $J_n(x+dx,y+dy)$ is a target position of the characteristic point included in the random structure in the image, $p_x$ is a horizontal coordinate of a midpoint of the structure block in the random structure, $p_y$ is a vertical coordinate of the midpoint of the structure block in the random structure, $w_x$ is the number of pixels in a distance from the midpoint of the horizontal coordinate of the structure block to an edge of the structure block, $w_y$ is the number of pixels in a distance from the midpoint of the vertical coordinate of the structure block to an edge of the structure block, and N is the number of structure blocks in the random structure.

Tracking the random structure obtained in step 206 is to perform pyramid optical flow tracking on each random structure in a unit of a random structure. When each random structure is tracked using the pyramid optical flow tracking algorithm, iteration may be performed on each layer of a pyramid from a top layer to a bottom layer according to Formula (1), so as to ultimately obtain a displacement of each random structure. In specific calculation, $\epsilon(d)$ needs to be minimal, that is, d needs to be minimal. It is assumed that $d=\bar{v}$, and then Formula (1) may be made zero, that is, $$\varepsilon(d) = \qquad (2)$$
$$\varepsilon(d_x, d_y) = \sum_{n=0}^{N} \sum_{x=p_x-w_x}^{p_x+w_x} \sum_{y=p_y-w_y}^{p_y+w_y} (I_n(x, y) - J_n(x + dx, y + dy))^2 = 0$$

Then a value of a displacement that makes Formula (2) true is obtained. Derivation is performed on Formula (2), and the following may be obtained:

$$\frac{1}{2}\left[\frac{\partial \varepsilon(\bar{v})}{\partial \bar{v}}\right]^T \approx G\bar{v} - \bar{b}, \qquad (3)$$

where G and $\bar{b}$ are respectively:

$$G \approx \sum_{n=0}^{N} \sum_{x=p_x-w_x}^{p_x+w_x} \sum_{y=p_y-w_y}^{p_y+w_y} \begin{bmatrix} I_{n_x}^2 & I_{nx}I_{ny} \\ I_{nx}I_{ny} & I_{n_y}^2 \end{bmatrix}$$

and $$\bar{b} = \sum_{n=0}^{N} \sum_{x=p_x-w_x}^{p_x+w_x} \sum_{y=p_y-w_y}^{p_y+w_y} \begin{bmatrix} \delta I_n & I_{nx} \\ \delta I_n & I_{ny} \end{bmatrix};$$

where $I_{n_x}$ and $I_{n_y}$ are respectively a gradient in an x direction and a gradient in a y direction of a certain characteristic point in an $n^{th}$ structure block, $\delta I_n$ represents a displacement of the certain characteristic point in the structure block in an original image and image to be tracked, $p_x$ is a horizontal coordinate of a midpoint of a structure block in the random structure, $p_y$ is a vertical coordinate of the midpoint of the structure block in the random structure, $w_x$ is the number of pixels in a distance from the midpoint of the horizontal coordinate of the structure block to an edge of the structure block, $w_y$ is the number of pixels in a distance from the midpoint of the vertical coordinate of the structure block to an edge of the structure block, N is the number of structure blocks in the random structure, and $\delta I_n = I_n(x,y) - J_n(x+dx, y+dy)$.

By further calculation, the following is obtained:

$$\overline{v}_{opt} = G^{-1}\overline{b} \quad (4)$$

In the foregoing embodiment, various random structures are generated according to an object to be tracked, and a pyramid optical flow tracking algorithm is used to track the object to be tracked in a unit of each random structure, thereby avoiding ambiguity in a tracking process and effectively improving tracking precision.

It should be noted that, on a basis of the foregoing embodiment, the following operation may be executed after S205.

Filter out a first error characteristic point that has an error exceeding a second set value and is included in all structure blocks in the random structure, so as to obtain a random structure that undergoes first error filtration. Correspondingly, in S206, the optical flow tracking algorithm may be used to track all structure blocks in the random structure that undergoes the first error filtration.

Optionally, it may be seen from the description in S206 that, statistics can be collected on errors that occur during an iteration process because tracking of the random structure using the pyramid optical flow tracking algorithm relates to the iteration process. When an error of a certain random structure block that occurs during a tracking process is greater than the second set value, it is considered that the random structure block encounters a tracking error. In this case, characteristic points included in the random structure can be marked, and the random structure including these characteristic points is no longer tracked. During a process of pyramid optical flow tracking, a random structure whose error is greater than the second set value is continuously filtered out, so as to obtain the random structure that undergoes the first error filtration. The second set value is an error value set for a tracking error that occurs during the tracking process of the random structure, and may be a value set for a convergence condition in iteration. For example, after iteration is performed for a certain number of times, if a convergence value of a displacement value is greater than a specific value, it is considered that a tracking error occurs. In this case, the specific value is the second set value.

Further, on a basis of obtaining the random structure that undergoes the first error filtration, the following operation may be executed: filtering out, using a NCC method, a second error characteristic point from characteristic points included in all structure blocks in the random structure that undergoes the first error filtration, so as to obtain a random structure that undergoes error second filtration. Correspondingly, in S206, the optical flow tracking algorithm may be used to track all structure blocks in the random that undergoes the second error filtration.

Optionally, after calculation using the pyramid optical flow tracking algorithm is completed, the NCC or another error measuring method may be used to filter out a characteristic point that has a large error and is in characteristic points included in all structure blocks in the obtained random structure that undergoes the first error filtration. For example, an error tracking point may be determined and filtered out according to a characteristic, such as a color or brightness of the characteristic point, that is, a second error characteristic point is filtered out, so as to obtain the random structure that undergoes the second error filtration. The NCC method may be calculating an NCC correlation coefficient for each set of structure blocks, that is, an error coefficient obtained after area normalization. After all NCC correlation coefficients are obtained by calculation, based on statistical analysis, such as a method for obtaining an average value, a structure block that is corresponding to an NCC whose error is greater than the average value is filtered out.

207: Determine that an average value or a median value of the position offset of the random structure as the position offset of the object to be tracked.

208: Add up the position offset of the object to be tracked and the initial position of the object to be tracked, to obtain the target position of the object to be tracked.

Integrated calculation may be performed on the position offset of the random structure. For example, the average value or the median value of the position offset may be obtained, and the average value or the median value is used as the position offset of the object to be tracked.

Further, after a displacement of the object to be tracked is obtained, the position offset of the object to be tracked may be added up with the initial position of the object to be tracked, and it is determined that a sum of the position offset and the initial position is the target position of the object to be tracked. It should be noted that both the offset position and the initial position may be represented by a vector or coordinate, and an additive operation of the position offset and the initial position is a vector operation instead of addition of figures in a common sense.

According to the optical flow tracking method provided in the embodiment of the present invention, characteristic points of an object to be tracked in an image are obtained, a random structure is generated according to the characteristic points, each random structure is tracked to obtain a position offset of the random structure, so as to estimate a position of the object to be tracked, and the position offset of the object to be tracked is added up with an initial position of the object to be tracked, so as to obtain a target position of the object to be tracked, thereby reducing tracking errors and effectively improving tracking precision.

Figure 4:
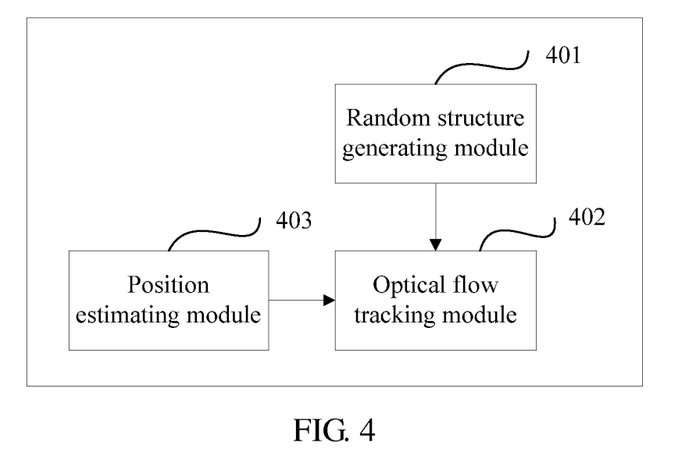
FIG. 4 is a schematic structural diagram of an optical flow tracking apparatus according to a third embodiment of the present invention.

FIG. 4 is a schematic structural diagram of an optical flow tracking apparatus according to a third embodiment of the present invention. As shown in FIG. 4, the optical flow tracking apparatus provided in the embodiment of the present invention includes a random structure generating module 401 configured to generate a random structure according to an object to be tracked in an image, where the random structure includes at least two structure blocks with fixed relative positions, and each structure block includes at least one characteristic point of the object to be tracked; an optical flow tracking module 402 configured to track all structure blocks in the random structure using an optical flow tracking algorithm, to obtain a position offset of the random structure; and a position estimating module 403 configured to estimate a target position of the object to be tracked according to the position offset of the random structure.

Optionally, the random structure generating module 401 may be configured to generate, according to an initial position and a size of the object to be tracked in the image, a gradient image of the image in which the object to be tracked is located; scan the gradient image to obtain a gradient histogram of the gradient image, and determine, according to the gradient histogram, characteristic points with an average gradient greater than a first set value; determine the number of structure blocks included in the random structure, and select at least one characteristic point from the characteristic points with the average gradient greater than the first set value; set a range of a distance between structure blocks and determine characteristic points corresponding to all structure blocks in the random structure according to a position of the selected characteristic point in the image and the number of structure blocks; and generate the random structure according to the characteristic points corresponding to all structure blocks in the random structure.

Optionally, the optical flow tracking module 402 may be configured to use an optical flow tracking algorithm $$\varepsilon(d) = \varepsilon(d_x, d_y) = \sum_{n=0}^{N} \sum_{x=p_x-w_x}^{p_x+w_x} \sum_{y=p_y-w_y}^{p_y+w_y} (I_n(x, y) - J_n(x + dx, y + dy))^2,$$

to determine a sum of displacement residuals of all structure blocks in the random structure, where the sum of displacement residuals of all structure blocks in the random structure is used as the position offset of the random structure; and $\varepsilon(d)$ is the sum of the displacement residuals of all structure blocks in the random structure, d is a displacement of a structure block, $d_x$ is a displacement of the structure block in an x direction, $d_y$ is a displacement of the structure block in a y direction, dx is a displacement of a characteristic point included in the random structure in the x direction, dy is a displacement of the characteristic point included in the random structure in the y direction, x is a horizontal coordinate of an initial position of the characteristic point included in the random structure in the image, y is a vertical coordinate of the initial position of the characteristic point included in the random structure in the image, $I_n(x,y)$ is the initial position of the characteristic point included in the random structure in the image, $J_n(x+dx,y+dy)$ is a target position of the characteristic point included in the random structure in the image, $p_x$ is a horizontal coordinate of a midpoint of the structure block in the random structure, $p_y$ is a vertical coordinate of the midpoint of the structure block in the random structure, $w_x$ is the number of pixels in a distance from the midpoint of the horizontal coordinate of the structure block to an edge of the structure block, $w_y$ is the number of pixels in a distance from the midpoint of the vertical coordinate of the structure block to an edge of the structure block, and N is the number of structure blocks in the random structure.

Figure 5:
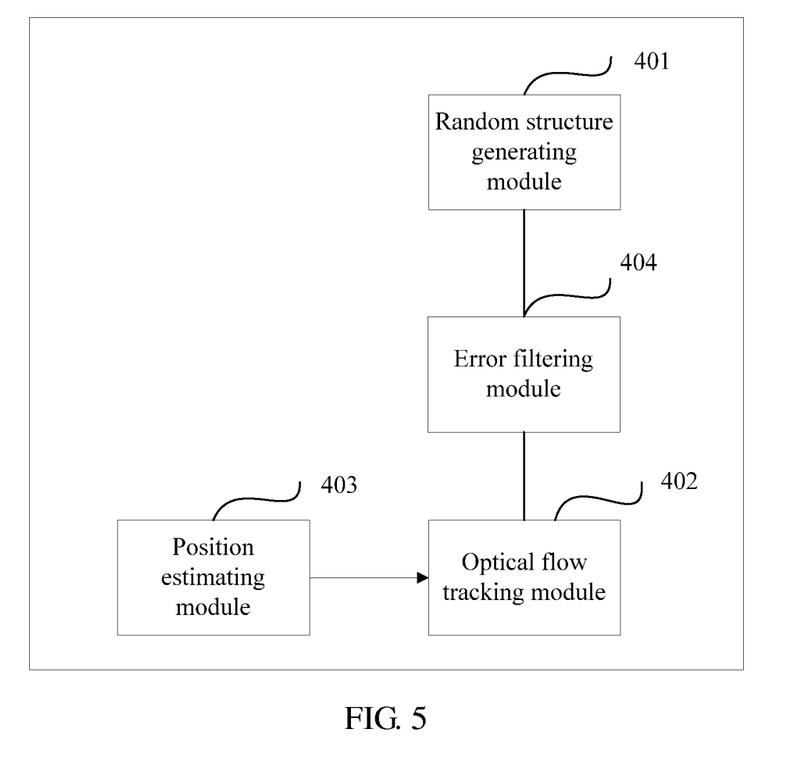
FIG. 5 is a schematic structural diagram of an optical flow tracking apparatus according to a fourth embodiment of the present invention.

FIG. 5 is a schematic structural diagram of an optical flow tracking apparatus according to a fourth embodiment of the present invention. Optionally, on a basis of the embodiment shown in FIG. 4, the apparatus may further include an error filtering module 404 configured to filter out a first error characteristic point that has an error exceeding a third set value and is included in all structure blocks in the random structure, so as to obtain a random structure that undergoes first error filtration; and correspondingly, the optical flow tracking module 402 may be configured to use the optical flow tracking algorithm to track all structure blocks in the random structure that undergoes the first error filtration.

Optionally, the error filtering module 404 may be further configured to filter out, using a NCC method, a second error characteristic point from characteristic points included in all structure blocks in the random structure that undergoes the first error filtration, so as to obtain a random structure that undergoes second error filtration; and correspondingly, the optical flow tracking module 402 may be configured to use the optical flow tracking algorithm to track all structure blocks in the random structure that undergoes the second error filtration.

Optionally, the position estimating module 403 may be configured to determine that an average value or a median value of the position offset of the random structure as a position offset of the object to be tracked; and add up the position offset of the object to be tracked and the initial position of the object to be tracked, to obtain the target position of the object to be tracked. It should be noted that both the offset position and the initial position may be represented by a vector or coordinate, and an additive operation of the offset position and the initial position is a vector operation instead of addition of figures in a common sense.

The optical flow tracking apparatus provided in the embodiment may be configured to implement the technical solution in any one of the foregoing method embodiments. For a specific implementation principle of the function modules included in the apparatus, reference may be made to the foregoing method embodiments, and details are not repeatedly described herein.

According to the optical flow tracking apparatus provided in the embodiment of the present invention, characteristic points of an object to be tracked in an image are obtained, a random structure is generated according to the characteristic points, and each random structure is tracked to obtain a position offset of the random structure, so as to estimate a position of the object to be tracked. In comparison with a manner of tracking characteristic points one by one in the prior art, in the tracking method in the embodiment of the present invention, tracking errors are reduced and tracking precision is effectively improved using a structural constraint.

Figure 6:
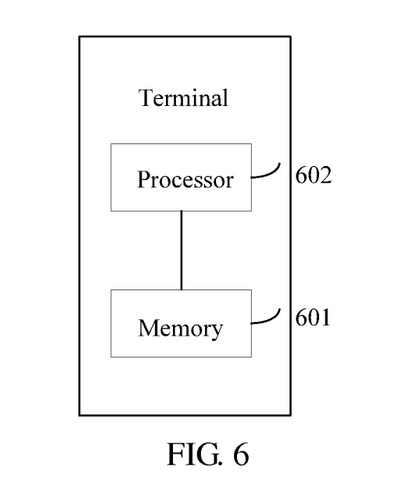
FIG. 6 is a schematic structural diagram of an optical flow tracking apparatus according to a fifth embodiment of the present invention.

FIG. 6 is a schematic structural diagram of an optical flow tracking apparatus according to a fifth embodiment of the present invention. As shown in FIG. 6, the optical flow tracking apparatus may include a memory 601 and a processor 602 that communicates with the memory 601, where the memory 601 stores a set of program code, and the processor 602 is configured to call the program code stored in the memory and execute the following method: generating a random structure according to an object to be tracked in an image, where the random structure includes at least two structure blocks with fixed relative positions, and each structure block includes at least one characteristic point of the object to be tracked; tracking all structure blocks in the random structure using an optical flow tracking algorithm, to obtain a position offset of the random structure; and estimating a target position of the object to be tracked according to the position offset of the random structure.

Optionally, that the processor 602 executes the generating a random structure according to an object to be tracked in an image may be generating, according to an initial position and a size of the object to be tracked in the image, a gradient image of the image in which the object to be tracked is located; scanning the gradient image to obtain a gradient histogram of the gradient image, determining, according to the gradient histogram, characteristic points with an average gradient greater than a first set value; determining the number of structure blocks included in the random structure, and selecting at least one characteristic point from the characteristic points with the average gradient greater than the first set value; setting a range of a distance between structure blocks and determining characteristic points corresponding to all structure blocks in the random structure according to a position of the selected characteristic point in the image and the number of structure blocks that is selected; and generating the random structure according to the characteristic points corresponding to all structure blocks in the random structure.

Optionally, that the processor 60 executes the tracking all structure blocks in the random structure using an optical flow tracking algorithm, to obtain a position offset of the random structure may be using the optical flow tracking algorithm $$\varepsilon(d) = \varepsilon(d_x, d_y) = \sum_{n=0}^{N} \sum_{x=p_x-w_x}^{p_x+w_x} \sum_{y=p_y-w_y}^{p_y+w_y} (I_n(x, y) - J_n(x+dx, y+dy))^2,$$

to determine a sum of displacement residuals of all structure blocks in the random structure, where the sum of displacement residuals of all structure blocks in the random structure is used as the position offset of the random structure; and $\varepsilon(d)$ is the sum of the displacement residuals of all structure blocks in the random structure, d is a displacement of a structure block, $d_x$ is a displacement of the structure block in an x direction, $d_y$ is a displacement of the structure block in a y direction, dx is a displacement of a characteristic point included in the random structure in the x direction, dy is a displacement of the characteristic point included in the random structure in the y direction, x is a horizontal coordinate of an initial position of the characteristic point included in the random structure in the image, y is a vertical coordinate of the initial position of the characteristic point included in the random structure in the image, $I_n(x,y)$ is the initial position of the characteristic point included in the random structure in the image, $J_n(x+dx,y+dy)$ is a target position of the characteristic point included in the random structure in the image, $p_x$ is a horizontal coordinate of a midpoint of the structure block in the random structure, $p_y$ is a vertical coordinate of the midpoint of the structure block in the random structure, $w_x$ is the number of pixels in a distance from the midpoint of the horizontal coordinate of the structure block to an edge of the structure block, $w_y$ is the number of pixels in a distance from the midpoint of the vertical coordinate of the structure block to an edge of the structure block, and N is the number of structure blocks in the random structure.

Optionally, after executing the generating a random structure according to an object to be tracked in an image, the processor 602 may further execute filtering out a first error characteristic point that has an error exceeding a second set value and is included in all structure blocks in the random structure, so as to obtain a random structure that undergoes first error filtration.

Correspondingly, that the processor 602 executes the tracking all structure blocks in the random structure using an optical flow tracking algorithm includes using the optical flow tracking algorithm to track all structure blocks in the random structure that undergoes the first error filtration.

Optionally, after executing the filtering out a first error characteristic point that has an error exceeding a second set value and is included in all structure blocks in the random structure, so as to obtain a random structure that undergoes the first error filtration, the processor 602 may further execute filtering out, using a NCC method, a second error characteristic point from characteristic points included in all structure blocks in the random structure that undergoes the first error filtration, so as to obtain a random structure that undergoes second error filtration.

Correspondingly, that the processor 602 executes the tracking all structure blocks in the random structure using an optical flow tracking algorithm includes using the optical flow tracking algorithm to track all structure blocks in the random structure that undergoes the second error filtration.

Optionally, that the processor 602 executes the estimating a position of the object to be tracked according to the position offset of the random structure is determining that an average value or a median value of the position offset of the random structure as a position offset of the object to be tracked; and adding up the position offset of the object to be tracked and the initial position of the object to be tracked, to obtain the target position of the tracked object.

It should be noted that the optical flow tracking apparatus provided in the embodiment may be various types of terminal devices, such as a personal computer (PC), a PAD or a mobile phone. The processor may be a device with a data processing function, such as a central processing unit (CPU), a graphic processing unit (GPU) or a digital signal processor (DSP).

The optical flow tracking apparatus provided in the embodiment may be configured to execute the technical solution in any one of the foregoing method embodiments, where an implementation principle and a technical effect are similar, and therefore details are not repeatedly described herein.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An optical flow tracking method, implemented by a device with an image processing function, the method comprising:
    generating, by a processor of the device, a random structure according to an object to be tracked in an image captured by the device, wherein the random structure comprises at least two structure blocks with fixed relative positions, and wherein each of the structure blocks comprises at least one characteristic point of the object to be tracked;
    tracking, by the processor, all structure blocks in the random structure using an optical flow tracking algorithm to obtain a position offset of the random structure; and
    estimating, by the processor, a target position of the object to be tracked according to the position offset of the random structure,
    wherein estimating the position of the object to be tracked according to the position offset of the random structure comprises:

determining that an average value or a median value of the position offset of the random structure as a position offset of the object to be tracked; and adding up the position offset of the object to be tracked and the initial position of the object to be tracked, to obtain the target position of the object to be tracked.

2. The method according to claim 1, wherein generating the random structure according to the object to be tracked in the image comprises:

generating, according to an initial position and a size of the object to be tracked in the image, a gradient image of the image;

scanning the gradient image to obtain a gradient histogram of the gradient image;

determining, according to the gradient histogram, characteristic points with an average gradient greater than a first set value;

determining the number of structure blocks that are part of the random structure;

selecting at least one characteristic point from the characteristic points with the average gradient greater than the first set value;

setting a range of a distance between structure blocks and determining characteristic points corresponding to all structure blocks in the random structure according to a position of the selected characteristic point in the image and the number of structure blocks; and generating the random structure according to the characteristic points corresponding to all structure blocks in the random structure.

3. The method according to claim 1, wherein tracking all the structure blocks in the random structure using the optical flow tracking algorithm to obtain the position offset of the random structure comprises determining a sum of displacement residuals of all structure blocks in the random structure as the position offset of the random structure using the optical flow tracking algorithm $$\varepsilon(d) = \varepsilon(d_x, d_y) = \sum_{n=0}^{N} \sum_{x=p_x-w_x}^{p_x+w_x} \sum_{y=p_y-w_y}^{p_y+w_y} (I_n(x, y) - J_n(x+dx, y+dy))^2,$$

wherein $\varepsilon(d)$ is the sum of the displacement residuals of all structure blocks in the random structure, wherein d is a displacement of a structure block, wherein $d_x$ is a displacement of the structure block in an x direction, wherein $d_y$ is a displacement of the structure block in a y direction, wherein dx is a displacement of a characteristic point that is part of the random structure in the x direction, wherein dy is a displacement of the characteristic point that is part of the random structure in the y direction, wherein x is a horizontal coordinate of an initial position of the characteristic point that is part of the random structure in the image, wherein Y is a vertical coordinate of the initial position of the characteristic point that is part of the random structure in the image, wherein $I_n(x,y)$ is the initial position of the characteristic point that is part of the random structure in the image, wherein $J_n(x+dx,y+dy)$ is a target position of the characteristic point that is part of the random structure in the image, wherein $p_x$ is a horizontal coordinate of a midpoint of the structure block in the random structure, wherein $p_y$ is a vertical coordinate of the midpoint of the structure block in the random structure, wherein $w_x$ is the number of pixels in a distance from the midpoint of the horizontal coordinate of the structure block to an edge of the structure block, wherein $w_y$ is the number of pixels in a distance from the midpoint of the vertical coordinate of the structure block to an edge of the structure block, and wherein N is the number of structure blocks in the random structure.

4. The method according to claim 3, wherein after generating the random structure according to the object to be tracked in the image, the method further comprises filtering out a first error characteristic point that has an error exceeding a second set value and is part of all structure blocks in the random structure to obtain a random structure that undergoes first error filtration, and wherein tracking all structure blocks in the random structure using the optical flow tracking algorithm comprises tracking all structure blocks in the random structure that undergoes first error filtration using the optical flow tracking algorithm.

5. The method according to claim 4, wherein after filtering out the first error characteristic point that has the error exceeding the second set value and is part of all structure blocks in the random structure to obtain a random structure that undergoes the first error filtration, the method further comprises filtering out, using a normalized correlation coefficient (NCC) method, a second error characteristic point from characteristic points that are part of all structure blocks in the random structure that undergoes the first error filtration, to obtain a random structure that undergoes second error filtration, and wherein tracking all structure blocks in the random structure using the optical flow tracking algorithm comprises tracking all structure blocks in the random structure that undergoes the second error filtration using the optical flow tracking algorithm.

6. The method according to claim 1, wherein the image is divided into a plurality of local area pixel blocks, and wherein each respective characteristic point of the at least one characteristic point is a description of a local area pixel block in the image.

7. The method according to claim 6, wherein the description comprises a description of a position of the local area pixel block and a description of a specific characteristic of the local area pixel block.

8. The method according to claim 7, wherein the description of the specific characteristic comprises one or more of the following characteristics of the local area pixel block: a color characteristic, a textual characteristic, and a spatial relationship characteristic.

9. The method according to claim 1, wherein the optical flow tracking algorithm comprises a pyramid optical flow tracking algorithm.

10. An optical flow tracking apparatus comprising:
a memory; and
a processor,
wherein the memory stores a set of program code, and
wherein the processor is configured to call the program code stored in the memory to execute the following steps:
generating a random structure according to an object to be tracked in an image, wherein the random structure comprises at least two structure blocks with fixed relative positions, and wherein each of the structure blocks comprises at least one characteristic point of the object to be tracked;
tracking all structure blocks in the random structure using an optical flow tracking algorithm to obtain a position offset of the random structure; and
estimating a target position of the object to be tracked according to the position offset of the random structure, and wherein estimating the target position of the object to be tracked comprises the following steps:

determining that an average value or a median value of the position offset of the random structure as a position offset of the object to be tracked; and adding up the position offset of the object to be tracked and the initial position of the object to be tracked to obtain the target position of the object to be tracked.

11. The apparatus according to claim 10, wherein the processor is further configured to execute determining a sum of displacement residuals of all structure blocks in the random structure as the position offset of the random structure using an optical flow tracking algorithm $$\varepsilon(d) = \varepsilon(d_x, d_y) = \sum_{n=0}^{N} \sum_{x=p_x-w_x}^{p_x+w_x} \sum_{y=p_y-w_y}^{p_y+w_y} (I_n(x,y) - J_n(x+dx, y+dy))^2,$$

wherein ε(d) is the sum of the displacement residuals of all structure blocks in the random structure, wherein d is a displacement of a structure block, wherein $d_x$ is a displacement of the structure block in an x direction, wherein $d_y$ is a displacement of the structure block in a y direction, wherein dx is a displacement of a characteristic point that is part of the random structure in the x direction, wherein $d_y$ is a displacement of the characteristic point that is part of the random structure in the y direction, wherein x is a horizontal coordinate of an initial position of the characteristic point that is part of the random structure in the image, wherein y is a vertical coordinate of the initial position of the characteristic point that is part of the random structure in the image, wherein $I_n(x,y)$ is the initial position of the characteristic point that is part of the random structure in the image, wherein $J_n(x+dx,y+dy)$ is a target position of the characteristic point that is part of the random structure in the image, wherein $p_x$ is a horizontal coordinate of a midpoint of the structure block in the random structure, wherein $p_y$ is a vertical coordinate of the midpoint of the structure block in the random structure, wherein $w_x$ is the number of pixels in a distance from the midpoint of the horizontal coordinate of the structure block to an edge of the structure block, wherein $w_y$ is the number of pixels in a distance from the midpoint of the vertical coordinate of the structure block to an edge of the structure block, and wherein N is the number of structure blocks in the random structure.

12. The apparatus according to claim 11, wherein the processor is further configured to execute the following steps:

filtering out a first error characteristic point that has an error exceeding a third set value and is part of all structure blocks in the random structure to obtain a random structure that undergoes first error filtration; and tracking all structure blocks in the random structure that undergoes the first error filtration using the optical flow tracking algorithm.

13. The apparatus according to claim 12, wherein the processor is further configured to execute the following steps:

filtering out, using a normalized correlation system (NCC) method, a second error characteristic point from characteristic points that are part of all structure blocks in the random structure that undergoes the first error filtration to obtain a random structure that undergoes second error filtration; and tracking all structure blocks in the random structure that undergoes the second error filtration using the optical flow tracking algorithm.

14. The apparatus according to claim 10, wherein the image is divided into a plurality of local area pixel blocks, and wherein each respective characteristic point of the at least one characteristic point is a description of a local area pixel block in the image.

15. The apparatus according to claim 14, wherein the description comprises a description of a position of the local area pixel block and a description of a specific characteristic of the local area pixel block.

16. The apparatus according to claim 15, wherein the description of the specific characteristic comprises one or more of the following characteristics of the local area pixel block: a color characteristic, a textual characteristic, and a spatial relationship characteristic.

17. The apparatus according to claim 10, wherein the optical flow tracking algorithm comprises a pyramid optical flow tracking algorithm.

18. An optical flow tracking apparatus comprising:

a memory; and a processor, wherein the memory stores a set of program code, and wherein the processor is configured to call the program code stored in the memory to execute the following steps:

generating a random structure according to an object to be tracked in an image, wherein the random structure comprises at least two structure blocks with fixed relative positions, and wherein each of the structure blocks comprises at least one characteristic point of the object to be tracked;

tracking all structure blocks in the random structure using an optical flow tracking algorithm to obtain a position offset of the random structure:

estimating a target position of the object to be tracked according to the position offset of the random structure:

generating, according to an initial position and a size of the object to be tracked in the image, a gradient image of the image;

scanning the gradient image to obtain a gradient histogram of the gradient image;

determining, according to the gradient histogram, characteristic points with an average gradient greater than a first set value;

determine the number of structure blocks that are part of the random structure;

selecting at least one characteristic point from the characteristic points with the average gradient greater than the first set value;

setting a range of a distance between structure blocks and determining characteristic points corresponding to all structure blocks in the random structure according to a position of the selected characteristic point in the image and the number of structure blocks; and generating the random structure according to the characteristic points corresponding to all structure blocks in the random structure.

* * * * *